United States Patent Office
3,833,725
Patented Sept. 3, 1974

3,833,725
DIALKYLATED GLYCOL COMPOSITIONS AND MEDICAMENT PREPARATIONS CONTAINING SAME
Geoffrey F. Thompson, Sunnyvale, Calif., assignor to Syntex Corporation, Panama, Republic of Panama
No Drawing. Filed Dec. 8, 1972, Ser. No. 313,431
Int. Cl. A61k 27/00
U.S. Cl. 424—243                    30 Claims

ABSTRACT OF THE DISCLOSURE

A pharmaceutical preparation having a minor amount of a medicament, a major amount of a dialkylated mono- or poly-alkylene glycol vehicle therefor, and a minor amount of one or more antioxidants for the dialkylated glycol vehicle.

FIELD OF THE INVENTION

This invention relates to medicament preparations and vehicles therefor. In presently preferred embodiments, the present invention relates to medicament preparations wherein the chemical potency of the medicament is stabilized, for extended periods of time, by dispersing or dissolving the medicament in an antioxidant containing d-alkylated mono- or poly-alkylene glycol vehicle therefor.

BACKGROUND OF THE INVENTION

The use of alkylene glycols or monoalkyl ethers thereof, either alone or in combination with other vehicle components, as carriers for medicaments, such as steroids or prostaglandins, is well-known. See, for example, Great Britain Patent No. 1,133,800; South African Patent No. 70/04245; and United States Patents Nos. 2,600,344; 2,856,329; 3,069,322; 3,592,930; and 3,673,213. Such carriers, however, do not, in general, provide requisite stabilizing properties for the medicament material. That is, after relatively short storage times, the chemical potency of the active medicament has degraded significantly to a point where the preparation, if taken at the recommended dosage level, might be of insufficient activity to accomplish the desired therapeutic objective.

Of particular interest in the present invention are the family of materials known as prostaglandins. Prostaglandins are a group of chemically related 20-carbon chain hydroxy fatty acids having the basic skeleton of prostanoic acids:

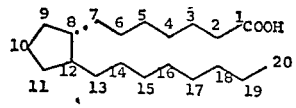

Prostanoic Acid

The prostaglandins having a hydroxy group at the C–11 position and a keto group at the C–9 position are known as the PGE series. Those having a hydroxyl group in place of the keto group at the C–9 position are known as the PGF series and are further designated by an $\alpha$ or $\beta$ suffix to indicate the configuration of the hydroxyl group at the C–9 position. The natural compounds are the $\alpha$-hydroxy substituted compounds. They may contain different degrees of unsaturation in the molecule, particularly at C–5, C–13, and C–17, the unsaturation is also indicated by a suffix. Thus, for example, $PGE_1$ refers to a prostanoic acid having a trans olefin bond at the 13-position. For a review on prostaglandins and the definition of primary prostaglandins, see, for example, S. Bergstrom, Recent Progress in Hormone Research 22, pp. 153–175 (1966) and S. Bergstrom, Science 157, page 382 (1967).

Using accepted nomenclature, prostaglandins of the PGE, PGF, PGA and PGB series are named as follows:

$PGE_1$: 11$\alpha$,15$\alpha$-dihydroxy-9-keto-13-prostenoic acid;
$PGE_2$: 11$\alpha$,15$\alpha$-dihydroxy-9-keto-5,13-prostadienoic acid;
$PGE_3$: 11$\alpha$,15$\alpha$-dihydroxy-9-keto-5,13,17-prostatrienoic acid;
$PGF_1$: 9$\alpha$,11$\alpha$,15$\alpha$-trihydroxy-13-prostenoic acid;
$PGF_2$: 9$\alpha$,11$\alpha$,15$\alpha$-trihydroxy-5,13-prostadienoic acid;
$PGA_1$: 15$\alpha$-hydroxy-9-keto-10,15-prostadienoic acid;
$PGA_2$: 15$\alpha$-hydroxy-9-keto-10,13,17-prostatrienoic acid;
$PGB_1$: 15$\alpha$-hydroxy-9-keto-8,13-prostadienoic acid; and
$PGB_2$: 15$\alpha$-hydroxy-9-keto-10,13,17-prostatrienoic acid.

Prostaglandins are widely distributed in mammalian tissues and have been isolated from natural sources in very small amounts. In addition a number of the natural occurring prostaglandins have been prepared by chemical synthesis; see for example, J. Am. Chem. Soc. 91, 5675 (1969), J. Am. Chem. Soc. 92, 2586 (1970), J. Am. Chem. Soc. 93, 1489–1493 (1971) and references cited therein, W. P. Schneider et al., J. Am. Chem. Soc. 90, 5895 (1968), U, Axen et al., Chem. Commun., 303 (1969), and W. P. Schneider, Chem. Commun., 304 (1969).

Because of the remarkable range of biological and pharmacological properties exhibited by this family of compounds, a great deal of interest has focused upon such compounds. It is known, however, that prostaglandins in general, and specifically $PGE_2$, are, from a chemical point of view, relatively unstable. See, for example, Brummer J. Pharm. Pharmac. 23, 804 (1971), and Karim et al., European J. Pharmacol. 4, 416 (1968). It would, therefore, be desirable to have a prostaglandin preparation wherein the prostaglandin material is stabilized by the vehicle material.

OBJECTS OF THE INVENTION

It is the primary object of this invention to provide novel vehicles for medicament preparations.

It is a further object of this invention to provide novel vehicles for medicaments which, in addition to serving as a carrier for the medicament, stabilize for an extended period of time the chemical potency of the medicament.

It is a further object of this invention to provide dialkylated mono- and poly-alkylene glycols as vehicles for medicament preparations.

It is a further object of this invention to provide medicament preparations having a dialkylated mono- or poly-alkylene glycol as the vehicle therefor.

It is a further object of this invention to provide novel, substantially anhydrous pharmaceutical preparations containing a dialkylated mono- or poly-alkylene glycol as the vehicle and at least one prostaglandin material.

It is a further object of this invention to provide medicament preparations having dialkylated mono- or poly-alkylene glycols as the vehicle therefor, and where the chemical potency of the medicament material is stabilized for extended periods of time through use of such dialkylated glycol vehicle.

It is a further object of this invention to provide substantially anhydrous prostaglandin preparations wherein the chemical potency of the prostaglandin material is stabilized through use of a dialkylated mono- or poly-alkylene glycol as the vehicle for the preparation.

It is a further object of the present invention to provide a substantially anhydrous aspirin preparation where the chemical potency of the aspirin is stabilized through use of a dialkylated mono- or poly-alkylene glycol vehicle.

It is a further object of this invention to provide novel, substantially anhydrous pharmaceutical preparations containing a medicament material, a dialkylated mono- or poly-alkylene glycol as a vehicle for the medicament material, and at least one antioxidant for the glycol vehicle.

These and still further objects, features, and advantages of the present invention will become apparent upon consideration of the following detailed disclosure.

BRIEF SUMMARY OF THE INVENTION

The above and still further objects, features, and advantages of the present invention are achieved, in accordance therewith, by admixing a pharmaceutically active quantity of an active medicament material with a quantity of an antioxidant-containing dialkylated mono- or poly-alkylene glycol. In a specific embodiment, for example, the combination of $PGE_2$ with the dimethyl ether of polyethylene glycol 550 has exhibited a high degree of chemical stability after storage for an extended period of time at above room temperature.

The dialkylated mono- or poly-alkylene glycol of the present invention can be represented by the following structural formula:

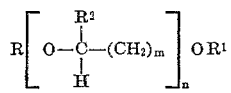

where R and $R^1$ are lower alkyl, $R^2$ is lower alkyl or hydrogen, $m$ is an integer from 1 to 6, and $n$ is an integer from 1 to a very large number, such as 500, such that the molecular weight of the glycol vehicle can be up to about 20,000 or so.

As used in this specification, the term "lower alkyl" refers to both straight and branched chain alkyl groups having from 1 to 6 carbon atoms, such as, for example, methyl, ethyl, n-propyl, isopropyl, n-butyl, isobutyl, t-butyl, n-amyl, n-hexyl, and the like.

Illustrative dialkylated glycol vehicles include for example, 1,2-dimethoxyethane (i.e., glyme), diglyme, triglyme, tetraglyme, polyethylene glycol - 350 - dimethyl ether, polyethylene glycol-550-dimethyl ether, polyethylene glycol-750-dimethyl ether, etc., where the numbers such as 350, 550 and 750, refer to the approximate average molecular weight of the polyethylene glycol vehicle. Depending upon the vehicle utilized and its molecular weight (or average molecular weight), the vehicle, and the corresponding pharmaceutical preparation will be liquids, semi-solids or waxes or solids at room temperature. Thus, as more fully described below, the pharmaceutical preparations of the present invention may take on a variety of unit dosage forms.

The dialkylated mono- or poly-alkylene glycols of the present invention are satisfactory carriers for a wide variety of active medicament materials, as will be shown below, and, in addition, has been shown to stabilize the chemical potency or activity of two distinct medicaments, i.e., $PGE_2$ and aspirin. The dialkylated glycol vehicle, however, is, itself, subject to undesirable oxidation and, therefore, should include a minor amount, generally about 0.01% to about 1.0%, of one or more antioxidants to protect the chemical stability of the vehicle itself. Exemplary antioxidants include propyl gallate, vitamin E, hydroquinone, hydroxycomarins, ethanolamine, lecithin, cephalin, ascorbic acid, malic acid, sorbitol, phosphoric acid, thiodipropionic acid and its esters, dithiocarbamates, butylated hydroxyanisole, and butylated hydroxytoluene, with a 50—50 mixture (by weight) of butylated hydroxyanisole and butylated hydroxy toluene presently being preferred.

In addition, the dialkylated glycol vehicle should be as pure as is technically or economically feasible. In particular, it should be substantially devoid of peroxides and/or other oxidation products thereof which tend in the quantities present in the vehicle, to interfere with its vehicle and/or stabilizing properties.

The medicament which can be utilized in the preparations of the present invention include therapeutic agents for topical application including antibiotics such as tetracycline, oxytetracycline, chlortetracycline, chloramiphenicol, gramicidin, and the like; anesthetics such as benzocaine, xylocaine, and the like; analgesics such as aspirin, 2-(6-methoxy-2-naphthyl)propionic acid, and the like; steroids having anti-inflammatory or other beneficial activity, such as $6\alpha,9\alpha$-difluoro-$11\beta$-hydroxy - $16\alpha,17\alpha$ - isopropylidenedioxy-pregna-1,4-diene - 3,20 - dione, $9\alpha,11\beta$, 21-trichloro-$6\alpha$-fluoro - $16\alpha,17\alpha$ - isopropylidene - dioxy-pregna-1,4-diene-3,20-dione, and those described in U.S. 3,592,930 which partial disclosure is incorporated herein by reference, and the like; naturally occurring or synthetic prostaglandins, such as $PGE_2$, $PGF_{2a}$, the other prostaglandins referred to above, and the like; N,N-bis-(2 - hydroxyethyl)palmitamide; antihistamines; antibacterials and fungicides; etc.

Incorporation of the medicament into the vehicle is in accordance with standard techniques and practices common to the pharmaceutical field, for example as described in Remington's Practice of Pharmacy, 12th Edition by Martin and Cook, Mach Publishing Company (1961).

The ratio of medicament to the dialkylated glycol vehicle can vary, depending upon the concentration of the medicament desired in the final unit dosage form. In general, however, the preparation should contain a therapeutically effective amount of the medicament, generally about 0.001%–10%, with the balance being substantially the dialkylated glycol vehicle. In formulating the preparation, care should be taken to select a method which substantially eliminates water from the preparation so as to make it substantially anhydrous. Methods which do not substantially eliminate water are not desirable since water retention in the preparation will result in reduced activity or potency of the preparation over an extended period of time. Retention or uptake of a minimum amount of water, up to about 5%, is for all practical purposes, unavoidable and, therefore, not undesirable. It is preferred, however, to maintain the amount of residual water at the lowest practical level and certainly at a level which does not diminish the advantages afforded by the present invention.

As indicated above, the present invention is applicable to the use of a great variety of medicament materials as the pharmaceutically active component of the preparations of the present invention, such as, for example, the naturally occurring or synthetic prostaglandins specifically set forth above. It has been shown that the vehicle of this invention has stabilizing properties with respect to certain medicaments. Certain of such medicaments, including certain prostaglandins, are more stable than other medicaments and, to the extent that they are more stable, the stabilizing effect of the dialkylated glycol vehicle may be correspondingly diminished. The combination of the dialkylated glycol vehicle and a relatively stable medicament is, nonetheless, considered to be within the scope of the present invention. To the extent that the particular medicament is relatively chemically unstable, as for example is $PGE_2$, the dialkylated glycol vehicle has been found to enhance the chemical stability of the medicament during long periods of storage at or above room temperature.

The final preparation should have a pH, or be adjusted to a pH, which provides for optimum stability for a given active component. For example, the pH of a $PGE_2$ formulation should be adjusted to about 4–5 (as determined from a 10% aqueous solution of the formulation) if the formulation is to have extended stability. pH adjustment can be made with any suitable acid or base, for example, citric acid, acetic acid, benzoic acid, hydrochloric acid, phosphoric acid, and the like.

Either at the time of initial production of the preparation of the present invention, or at some time subsequent thereto, the preparation can be formulated into a variety of pharmaceutical or veterinary compositions and, as such, can be administered in a wide variety of dosage forms suitable for enteral, parenteral, or topical administration. Such compositions may have a single medicament as the sole active component or a combination of pharmaceutically compatible medicaments may be utilized. The preparation is, thus, typically administered as a pharmaceutical composition containing the pharmaceutically active medicament(s) and/or a pharmaceutically acceptable salt thereof, the dialkylated glycol vehicle, and one or more non-toxic antioxidants for the glycol vehicle. If desired, additional carrier or adjuvants may be utilized in preparing the pharmaceutical compositions. The administerable pharmaceutical composition may take the form of creams, ointments, oral or vaginal tablets, rectal or vaginal suppositories, encapsulated preparations, bougies, food premixes, of the like, preferably in unit dosage forms for simple administration of precise dosages. Since the vehicles of this invention are generally liquids or semi-solids, depending upon the molecular weight thereof, creams, ointments, suppositories and solutions are the preferred administration forms. Auxiliary non-toxic solid carriers which can be used in conjunction with the dialkylated glycol vehicle for tablet preparations include, for example, pharmaceutical grades of mannitol, lactose, starches, magnesium stearate, sodium saccharin, talcum, sodium bisulfite, and the like. Liquid pharmaceutically administerable compositions can, for example, be formulated by utilizing a liquid dialkylated glycol vehicle to thereby form a solution. If desired, the pharmaceutical composition to be administered may also contain minor amounts of non-toxic auxiliary substances such as wetting or emulsifying agents, pH buffering agents, and the like, for example, sodium acetate, sorbitan monolaurate, triethanolamine oleate, etc. Actual methods of preparing such dosage forms, are known, or will be apparent, to those skilled in this art.

DESCRIPTION OF SPECIFIC EMBODIMENTS

The following specific description is given to enable those skilled in this art to more clearly understand and practice the present invention. It should not be considered as a limitation upon the scope of the invention but merely as being illustrative and representative thereof.

EXAMPLES I–XIV

The solubility (expressed as mg. medicament per ml. of vehicle) at 30° C. of fourteen different medicaments in polyethylene glycol-550-dimethyl ether is given in the following table:

TABLE I

| Ex. | Medicament | Solubility (mg./ml.) |
|---|---|---|
| I | 6α,9α-difluoro-11β-hydroxy-16α,17α-isopropylidenedioxy-pregna-1,4-diene-3,20-dione. | 6.5 |
| II | 9α,11β,21-trichloro-6α-fluoro-16α,17α-isopropylidenedioxy-pregna-1,4-diene-3,20-dione. | 1.5 |
| III | $PGE_2$ | 2.0 |
| IV | $PGF_2\alpha$ | 36.0 |
| V | N,N-bis(2-hydroxyethyl)-palmitamide | 2.7 |
| VI | 2-(6-methoxy-2-naphthyl)propionic acid | 50.0 |
| VII | Aspirin (acetylsalicylic acid) | 120.0 |
| VIII | Benzocaine | 111.0 |
| IX | Xylocaine | 57.0 |
| X | Chloramphenicol | 70.0 |
| XI | Gramicidin | 4.4 |
| XII | Tetracycline | 125.0 |
| XIII | Oxytetracycline hydrochloride | 0.34 |
| XIV | Chlortetracycline hydrochloride | 0.416 |

EXAMPLE XV

A formulation is prepared having 0.5 g. aspirin per 1.0 g. polyethylene glycol-750-dimethyl ether, and stored at 80° C. Decomposition of the aspirin is measured vs. time. The time for 10% decomposition is 27 hours. This reflects approximately a 30 month shelf-life at 25° C. This can be compared to a published report [Jun et al., J. Pharm. Sec. Vol. 61, 1160 (1972)] which indicates that the time for 10% decomposition of aspirin in several polyethylene glycols at 80° C. is 2 hours reflecting a shelf-life at 25° C. of only 3.5 months.

EXAMPLE XVI

A formulation is prepared having 1 mg. $PGE_2$ per ml. 1,2-dimethoxyethane. After 12 days storage at 60° C. under a nitrogen atmosphere, the $PGE_2$ assays 100% of the activity at time zero.

EXAMPLE XVII

A formulation is prepared having 1 mg. $PGE_2$ per ml. of triethylene glycol-dimethyl ether. After 5 days storage at 60° C. under a nitrogen atmosphere, the $PGE_2$ assays 100% of the activity at time zero.

EXAMPLES XVIII–XXV

The following formulations are prepared having 1 mg. $PGE_2$ per ml. of polyethylene glycol-550-dimethyl ether, and the additional material(s) as set forth below. The per cent activity of the $PGE_2$ after storage for 7 days at 80° C. is also given.

| Example | Additional material(s) | Activity, percent |
|---|---|---|
| XVIII | 0.05% citric acid, 0.025% BHA, and 0.025% BHT (sealed under air). | 99 |
| XIX | Same as XVIII, except sealed under nitrogen | 91 |
| XX | Same as XVIII, except 0.1% citric acid | 82 |
| XXI | Same as XX, except sealed under nitrogen | 86 |
| XXII | Same as XVIII | 87 |
| XXIII | Same as XIX | 87 |
| XXIV | 0.05% citric acid and 0.05% BHA (sealed under air). | 81 |
| XXV | Same as XXIV, except sealed under nitrogen | 99 |

EXAMPLE XXVI

A formulation is prepared having 1 mg. $PGE_2$, 0.01% edetic acid, 0.01% BHA and 0.01% BHT per ml. polyethylene glycol - 550 - dimethyl ether, and sealed in an ampule under nitrogen atmosphere. After 18 days storage at 80° C., the $PGE_2$ assays 100% of the activity at time zero.

EXAMPLES XXVII–XXIX

The following formulations are prepared having 1 mg. $PGE_2$ per ml. polyethylene glycol-550-dimethyl ether, and the additional material(s) as set forth below, and the sealed in individual ampules under nitrogen atmosphere. The time ($t_{90}$) for 10% of the $PGE_2$ to decompose when stored at 80° C. is given. Also given is the corresponding $t_{90}$ for a formulation having 1 mg. $PGE_2$ per ml. polyethylene glycol-400, also sealed under nitrogen atmosphere.

| Example | Additional material(s) | $t_{90}$ |
|---|---|---|
|  | ($PGE_2$ in PEG 400) | 20 hours. |
| XXVII | 0.1% citric acid | 7.1 days. |
| XXVIII | 0.01% citric acid | 8.8 days. |
| XXIX | 0.01% BHA, 0.01% BHT, and 0.01% EDTA. | Undecomposed after 18 days. |

By comparison, 1 mg. $PGE_2$ and 1 ml. polyethylene glycol 400 assays 54% $PGE_2$ activity after storage for two months at 45° C.; 0.2 mg. $PGE_2$ in 2.7598 g. polyethylene glycol 4,000 assays 70% $PGE_2$ activity after storage for 6 months at room temperature and 72% $PGE_2$ activity after storage for 3 months at 45° C.; a suppository of 0.2 mg. $PGE_2$ in 2.7298 g. base comprising 2% polyethylene glycol 4,000 and 98% polyethylene glycol 1,000 assays 62% $PGE_2$ activity after storage for six months at room temperature; a formulation of $PGE_2$ in polyethylene glycol 400 assays 73% $PGE_2$ activity after 4 months at room temperature; and a formulation of $PGE_2$ in polyethylene glycol 4000 assays 82% $PGE_2$ activity after 5 months at room temperature.

It can thus be seen (from Examples XV–XXIX hereof) that the incorporation of aspirin or a prostaglandin material, particularly $PGE_2$, into the dialkylated glycol vehicle of the present invention stabilizes, for extended periods of time, the chemical potency of the particular medicament.

For a discussion of the significance of the date presented herein, and the extrapolation thereof to shelf-lives at room temperature, reference should be made, for example, to Kennon, "Use of Models in Determining Chemical Pharmaceutical Stability," J. of Pharm. Sciences, 53, 815–818 (July, 1964).

EXAMPLE XXX

A formulation is prepared containing 1 mg. PGE$_2$ per ml. of the diethyl ether of polyethylene glycol-750, and 0.025% BHA and 0.025% BHT.

EXAMPLE XXXI

A formulation is prepared having 1 mg. PGE$_2$ per ml. of the dipropylether of polyethylene glycol-550, and 0.025% BHA and 0.025% BHT.

EXAMPLE XXXII

A formulation is prepared having 1 mg. PGE$_2$ per ml. of the dimethyl ether of propylene glycol, and 0.025% BHA and 0.025% BHT.

EXAMPLE XXXIII

A formulation is prepared having 2 mg. of N,N-bis-(2-hydroxyethyl)-oleamide per ml. of 1,2-dimethoxyethane containing 0.025% BHT and 0.025% BHA. After 5 weeks at 80° C., the oleamide assays 96% of the activity at time zero. This reflects approximately 3–4 years shelf time at 25° C. In vitro, this compound inhibits lipase and, thus, may have utility as an anti-acne preparation.

While the present invention has been described with reference to specific embodiments thereof, it should be understood by those skilled in this art that various changes may be made and equivalents may be substituted without departing from the true spirit and scope of the invention. In addition, many modifications may be made to adapt a particular situation, material or composition of matter, process, process step or steps, or then-present objective to the spirit of this invention without departing from its essential teachings.

What is claimed is:

1. A composition comprising a major amount of a dialkylated glycol represented by the formula:

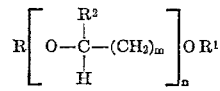

where R and R$^1$ are independently lower alkyl having 1 to 6 carbon atoms, R$^2$ is hydrogen or a lower alkyl having 1 to 6 carbon atoms, $m$ is an integer from 1 to 6, and $n$ is an integer from 1 to a very large number such that the molecular weight of said dialkylated glycol is up to about 20,000, and a minor amount of at least one antioxidant for said dialkylated glycol material, said composition being substantially devoid of peroxides and other oxidation products in quantities which interfere with the carrier or stabilizing properties of said composition.

2. The composition of Claim 1 wherein said dialkylated glycol is a dimethyl ether of a polyethylene glycol.

3. The composition of Claim 2 wherein said dialkylated glycol has a molecular weight from about 350 to about 750.

4. The composition of Claim 1 wherein said dialkylated glycol is 1,2-dimethoxyethane.

5. The composition of Claim 1 wherein said dialkylated glycol is a dimethyl ether of triethylene glycol.

6. The composition of Claim 1 wherein R and R$^1$ are methyl.

7. The composition of Claim 1 wherein R and R$^1$ are methyl, and R$^2$ is hydrogen.

8. The composition of Claim 1 wherein said antioxidant is selected from the group consisting of propyl gallate, vitamin E, butylated hydroxyanisole, butylated hydroxytoluene, and mixtures thereof.

9. The composition of Claim 1 wherein said composition includes about 0.01% to about 1.0% of said antioxidant.

10. The composition of Claim 1 wherein said composition includes about 0.025% butylated hydroxy anisole and about 0.025% butylated hydroxytoluene.

11. The composition of Claim 1 further including a therapeutically effective amount of active medicament material, or a pharmaceutically acceptable salt thereof.

12. The composition of Claim 1 wherein said composition contains less than 5% water.

13. The composition of Claim 11 wherein said composition contains less than 5% water.

14. The composition of Claim 11 wherein said medicament is an antibiotic.

15. The composition of Claim 11 wherein said medicament is relatively chemically unstable and the chemical activity of said medicament in said composition is stabilized by said dialkylated glycol over an extended period of time.

16. The composition of Claim 11 wherein said medicament is an anti-inflammatory steroid.

17. The composition of Claim 11 wherein said medicament is 6α,9α-difluoro-11β-hydroxy - 16α,17α - isopropylidenedioxypregna-1,4-diene-3,20-dione.

18. The composition of Claim 11 wherein said medicament is 9α,11β,21 - trichloro-6α-fluoro-16α,17α-isopropylidenedioxypregna-1,4-diene-3,20-dione.

19. The composition of Claim 11 wherein said medicament is a naturally occurring or synthetic prostaglandin.

20. The composition of Claim 11 wherein said composition contains less than 5% water, and said medicament is PGE$_2$, said dialkylated glycol serving to stabilize the chemical activity of said PGE$_2$ in said composition over extended periods of time.

21. The composition of claim 11 wherein said composition contains less than 5% water, and said medicament is acetyl salicylic acid, said dialkylated glycol serving to stabilize the chemical activity of said acetyl salicylic acid in said composition over extended periods of time.

22. The composition of Claim 11 wherein said composition contains less than 5% water, and said medicament is N,N-bis(2-hydroxyethyl) - oleamide, said dialkylated glycol serving to stabilize the chemical activity of said N,N-bis-(2-hydroxyethyl)-oleamide in said composition over extended periods of time.

23. A composition comprising a major amount of a dialkylated glycol represented by the formula:

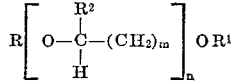

where R and R$^1$ are independently lower alkyl having 1 to 6 carbon atoms, R$^2$ is hydrogen or a lower alkyl having 1 to 6 carbon atoms, $m$ is an integer from 1 to 6, and $n$ is an integer from 1 to a very large number such that the molecular weight of said dialkylated glycol is up to about 20,000, and a therapeutically effective amount of an active medicament or a pharmaceutically acceptable salt thereof, said composition being substantially devoid of peroxides and other oxidation products in quantities which interfere with the carrier or stabilizing properties of said composition.

24. The composition of Claim 23 wherein said dialkylated glycol is selected from the group consisting of the dimethyl ether of polyethylene glycol, the dimethyl ether of triethylene glycol, glyme, diglyme, triglyme, and tetraglyme.

25. The composition of Claim 23 wherein said medicament is an anti-inflammatory steroid.

26. The composition of Claim 23 wherein said medicament is a naturally occurring or synthetic prostaglandin.

27. The composition of Claim 23 wherein said composition contains less than 5% water, and said medicament is selected from the group consisting of acetyl salicylic acid, $PGE_2$, and N,N-bis(2-hydroxyethyl)-oleamide, said dialkylated glycol serving to stabilize the chemical activity of said medicament in said composition over extended periods of time.

28. The composition of Claim 23 wherein said composition contains less than 5% water.

29. The composition of Claim 23 wherein said medicament is an antibiotic.

30. The composition of Claim 23 wherein said medicament is relatively chemically unstable and the chemical activity of said medicament in said composition is stabilized by said dialkylated glycol over an extended period of time.

References Cited

Lange, Chem. Abst., Vol. 69 (1968) p. 99303K.
Agami, Chem. Abst., Vol. 69 (1968) p. 76074X.

SAM ROSEN, Primary Examiner

U.S. Cl. X.R.

424—177, 224, 227, 230, 242, 305, 317, 318, 320, 358